3,597,151
DYEING AND/OR PRINTING ACRYLONITRILE
POLYMER TEXTILE MATERIAL
Hans Baumann, Ludwigshafen (Rhine), Hans-Richard
 Mueller, Fussgoenheim, Palatinate, Germany, assignors
 to Badische Anilin- & Soda-Fabrik Aktiengesellschaft,
 Ludwigshafen (Rhine), Germany
No Drawing. Filed June 4, 1968, Ser. No. 734,224
Claims priority, application Germany, June 13, 1967,
P 16 19 369.4
Int. Cl. D06p 3/70
U.S. Cl. 8—177                                4 Claims

ABSTRACT OF THE DISCLOSURE

A method of dyeing, printing or otherwise coloring acrylonitrile polymers or polyvinylidene dicyanides in which there is added the polymer to be colored a basic dye containing a flavylium cation. The basic dye can be incorporated directly into a solution of the polymer or can be applied to the polymer under conventional conditions for dyeing or printing textile materials with basic dyes.

We have found that dyes having the general formula:

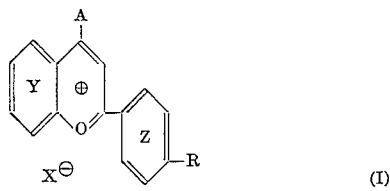

(I)

in which R denotes a hydrogen or halogen atom or an unsubstituted or substituted alkyl, alkoxy, acylamino, alkylamino, dialkylamino, arylamino, aryloxy, carbamoyl group or carboxylic ester group, $X^\ominus$ denotes an anion and A denotes the radical of a readily electrophilically substitutable compound, it being possible for the rings Y and Z to bear other substituents, are eminently suitable for dyeing and/ or printing acrylonitrile polymer textile material.

Examples of specific substituents R are chlorine, bromine, methyl, ethyl, methoxy, ethoxy, phenoxy, acetylamino, propionylamino, carbomethoxy or carboethoxy.

Examples of electrophilically readily substitutable compounds H—A are primary, secondary or tertiary aromatic amines having a free para-position, indoles, 1,3,3-trialkyl-2-methyleneindolines or their derivatives bearing substituents in the benzene nucleus, 1,2-dihydroquinolines, N-phenylpyrazolines or 1,2,3,4-tetrahydroquinolines.

Of these compounds the following are preferred: N,N-dialkylanilines, diphenylamines which may bear substituents in a phenyl ring, and N-substituted α-naphthylamines.

The following are examples of specific compounds H—A: dimethylaniline, diethylaniline, N,N-ethylcyanoethylaniline, N,N-dicyanoethylaniline, N-phenylmorpholine, diphenylamine, N-methyldiphenylamine, N-methyl - 4 - ethoxydiphenylamine, 4-acetaminodiphenylamine, 3 - methoxydiphenylamine, 4-methoxydiphenylamine, 3 - aminodiphenylamine, 4-aminodiphenylamine, 1,2,2,4 - tetramethyldihydroquinoline, 1-phenyl-3,5,5-trimethylpyrazoline-($\Delta^2$), N-ethyl-α-naphthylamine, and N-(4-ethoxyphenyl)-α-naphthylamine.

The anion $X^\ominus$ may be derived from an inorganic or organic, simple or complex acid. Examples are chloride, bromide, sulfate, methosulfate, perchlorate, acetate, tetrachlorozincate, dihydrogen phosphate and tetrafluoborate.

Examples of additional substituents for the rings Y and Z are alkyl, alkoxy, aryloxy, hydroxy or nitro groups or halogen atoms. Specific examples are chlorine, bromine, methyl, ethyl, methoxy, ethoxy or phenoxy.

Examples of typical dyes which are suitable for the process according to this invention are compounds having the formulae:

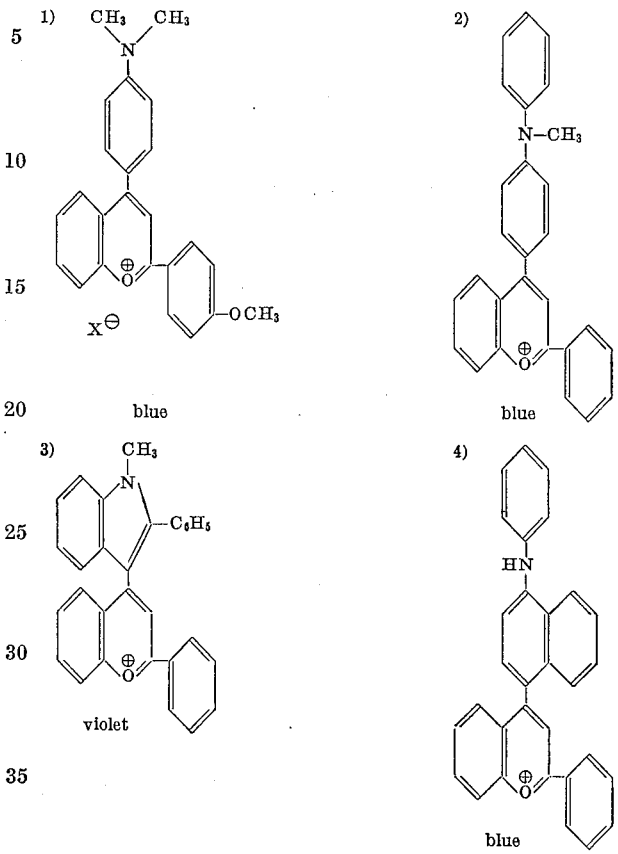

Dyes which it is preferred to use industrially have the general Formulae IIa and IIb:

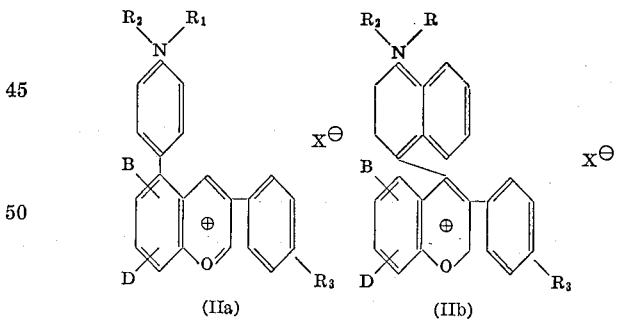

in which B denotes a hydrogen, chlorine or bromine atom or a methyl, ethyl, methoxy or ethoxy group; D denotes a hydrogen or chlorine atom or a methyl group; $R^1$ denotes an alkyl group having one to four carbon atoms, a hydroxyethyl, a hydroxypropyl, cyanoethyl, methoxyethyl, ethoxyethyl, acetoxyethyl, methoxypropyl, or ethoxypropyl group or a phenyl, chlorophenyl, methoxyphenyl, or ethoxyphenyl group; $R^2$ denotes a hydrogen atom or an alkyl group having one to four carbon atoms, a hydroxyethyl, hydroxypropyl, cyanoethyl, methoxyethyl, ethoxyethyl, acetoxyethyl, methoxypropyl or ethoxypropyl group, and $R^3$ denotes a hydrogen atom or a methoxy or ethoxy group and in which $X^\ominus$ has the meaning given above.

Among the dyes having the Formulae IIa and IIb, those are preferred in which B, D and $R^3$ denote hydrogen atoms.

Dyes having the general Formula I may be prepared very easily for example by heating flavylium perchlorates having the Formula III:

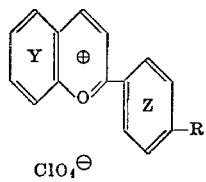

III with a compound A—H in the presence or absence of solvents.

Precursors of the compounds having the Formula II, for example those having the Formula IV:

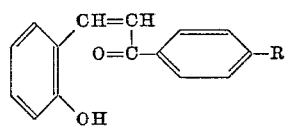

may be used instead of the compounds (III). A, R, Y and Z have the abovementioned meanings.

Preparation of the dye having the formula:

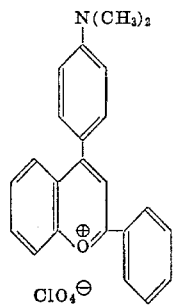

is described by R. Wizinger in Helevetica Chimica Acta 36, 526 (1953).

Dyes to be used according to the invention dye acrylonitrile polymers violet to green shades under the conventional conditions for basic dyes, if necessary with the simultaneous presence of assistants. They are also suitable for printing and dope dyeing as well as dyeing polyvinylidene dicyanide materials.

Dyeings having very good fastness properties, particularly good fastness to decatizing and light, are obtained in this way.

The invention is further illustrated by the following examples in which parts and percentages referred to are by weight.

EXAMPLE 1

100 parts of acrylonitrile polymer cloth is dyed for ninety minutes at boiling temperature with 0.6 part of the dye having the formula:

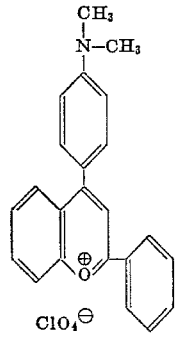

in a liquor of 2 parts of 96% sulfuric acid, 10 parts of sodium sulfate and 4000 parts of water and then well rinsed and dried. A bright blue dyeing having good fastness to light and decatizing is obtained.

EXAMPLE 2

100 parts of acrylonitrile polymer yarn is introduced into a liquor which has been prepared from 0.5 part of the dye having the formula:

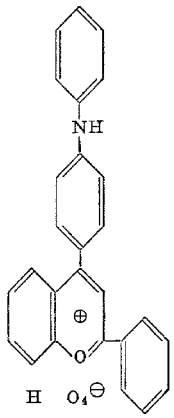

3 parts of 30% acetic acid, 10 parts of sodium sulfate, 1 part of lauryldimethylbenzylammonium chloride and 5000 parts of water. The yarn is treated for five minutes at 60° C. and the temperature is then raised to 85° C. Dyeing is then continued for thirty minutes at the boil. After the yarn has been rinsed and dried, a blue dyeing is obtained having very good fastess properties. (The above dye is prepared by boiling under reflux for one hour 2.24 parts of salicylideneacetophenone and 1.69 parts of diphenylamine in 15 parts of glacial acetic acid and 1 part of ortho-phosphoric acid (85%). 15 parts of water is added and the preicipitated dye is suction filtered).

EXAMPLE 3

An acrylonitrile polymer cloth is printed with a print paste which contains per kilogram up to 10 g. of the dye specified in Example 2, 30 g. of thiodiethylene glycol, 30 g. of 30% acetic acid, 10 g. of an organic non-volatile acid, such as citric acid, and if desired 30 g. N,N-di-($\beta$-cyanoethyl)-formamide and 600 g. of a thickener (18%). The print is steamed for twenty to thirty minutes wihout using pressure, rinsed, soaped and dried. A blue print having excellent fastness properties is obtained.

EXAMPLES 4–13

A solution of 1 part of the dye having the formula:

in 10 parts of dimethylformamide is added to a spinning sloution consisting of 100 parts of acrylonitrile polymer in dimethylformamide. When the solution is spun, fibres are obtained which are dyed a fast blue shade.

Other dyes which give fast dyeings in the shades indicated on polyacrylonitrile according to the dyeing processes described above are set out in the following table:

| Example | A | R | Shade |
|---|---|---|---|
| 5 | (p-aminophenyl) | H | Violet. |
| 6 | (N-phenyl-1-naphthylamino) | H | Green blue. |
| 7 | (1,3,3-trimethyl-2-methyleneindoline) | H | Do. |
| 8 | (p-dimethylaminophenyl) | OCH₃ | Blue. |
| 9 | (1-methyl-2-phenylindol-3-yl) | H | Violet. |
| 10 | (1-phenyl-3,5,5-trimethyl-pyrazolyl) with p-OC₂H₅ | H | Green blue. |
| 11 | (1-naphthylamino) | H | Blue green. |
| 12 | (4-diethylamino-1-naphthyl) | H | Green blue. |
| 13 | (4-dimethylamino-1-naphthyl) | H | Do. |

We claim:
1. A method for coloring acrylonitrile polymers or polyvinylidene dicyanides which comprises adding to the polymer to be colored a basic dye having one of the formulae

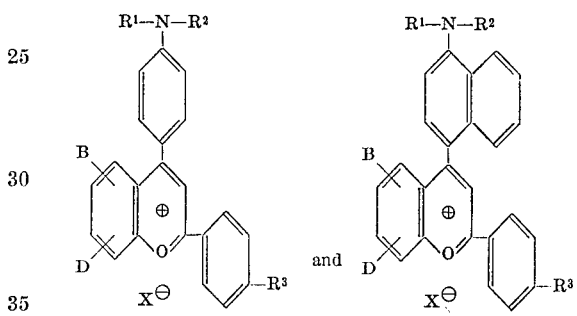

in which:

B denotes a hydrogen, chlorine, bromine, methyl, ethyl, methoxy or ethoxy;
D denotes hydrogen, chlorine or methyl;
R¹ denotes alkyl of one to four carbon atoms, hydroxyethyl, hydroxypropyl, cyanoethyl, methoxyethyl, ethoxyethyl, acetoxyethyl, methoxypropyl, ethoxypropyl, phenyl, chlorophenyl, methoxyphenyl or ethoxyphenyl;
R² denotes hydrogen, alkyl of one to four carbon atoms, hydroxyethyl, hydroxypropyl, cyanoethyl, methoxyethyl, ethoxyethyl, acetoxyethyl, methoxypropyl or ethoxypropyl;
R³ denotes hydrogen, methoxy or ethoxy, and
X⁰ denotes an anion.

2. A method as claimed in claim 1 wherein the basic dye is one of said formulae in which B, D and R³ each denotes a hydrogen atom.
3. A polyacrylonitrile textile material dye with a basic dye as defined in claim 1.
4. A polyacrylonitrile textile material dyed with a basic dye as defined in claim 2.

References Cited
UNITED STATES PATENTS
3,266,903   8/1966   Jurd _____ 260—345.2

OTHER REFERENCES
J. G. Cook, Handbook of Textile Fibers, 3rd ed. 1964, Merrow Publ. Co. Ltd., England, pp. 313–315.
B. Kramrisch, JSDC, vol. 73, March 1957, pp. 85–93.
R. Wizinger, Helvetica Chimica Acta 36, pp. 526–530, 1953.

GEORGE F. LESMES, Primary Examiner
T. J. HERBERT, Jr., Assistant Examiner

U.S. Cl. X.R.
260—345.2, 41

PO-1050
(5/69)

UNITED STATES PATENT OFFICE
CERTIFICATE OF CORRECTION

Patent No. 3,597,151          Dated August 3, 1971

Inventor(s) Hans Baumann and Hans-Richard Mueller

It is certified that error appears in the above-identified patent and that said Letters Patent are hereby corrected as shown below:

Column 2, lines 41-55, Formulae IIa and IIb reading

" 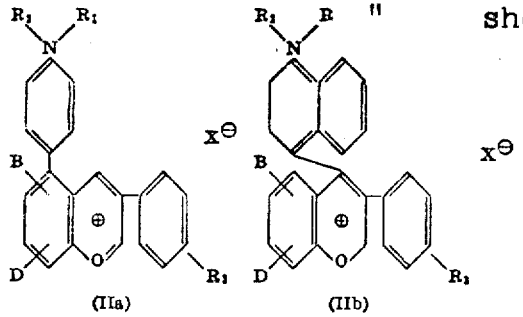 should read

-- 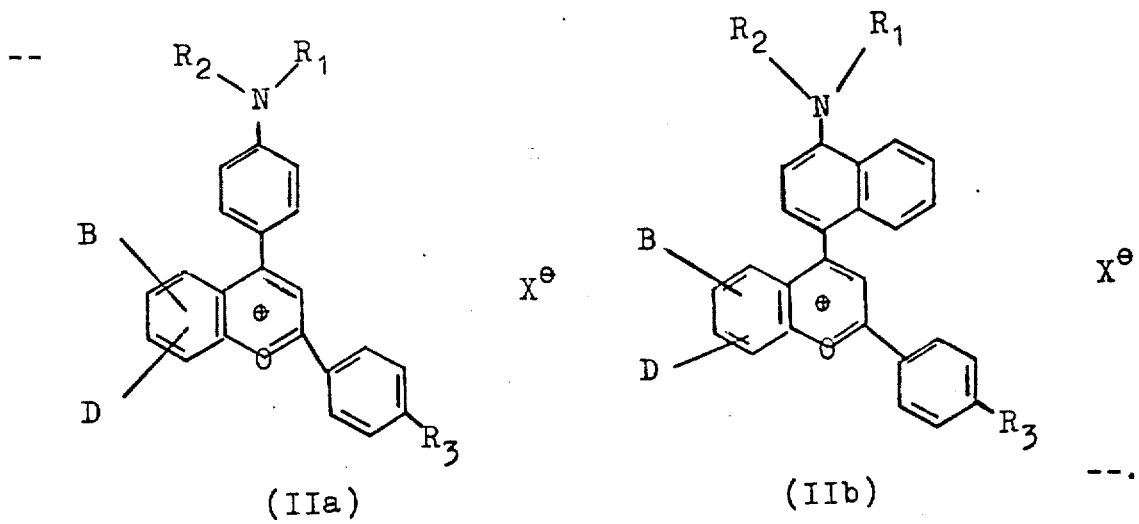 --.

Column 4, line 23, that portion of the formula reading "$H_2 O_4$" should read -- $H_2PO_4$ --; line 37, "preicipitated" should read -- precipitated --; line 45, "wihout" should read -- without --.

(next)

(2)

Column 4, line 73, "sloution consisting of 100" should read -- solution consisting of a solution of 100 --.

Column 6, line 42, "hydroxy" should read -- hydroxy - --.

Signed and sealed this 21st day of March 1972.

(SEAL)
Attest:

EDWARD M.FLETCHER,JR.  ROBERT GOTTSCHALK
Attesting Officer  Commissioner of Patents